United States Patent [19]

Halliar et al.

[11] 4,057,020

[45] Nov. 8, 1977

[54] CAM OPERATED HATCH COVER HOLDDOWN

[75] Inventors: William R. Halliar, Whiting; Marvin Stark, Michigan City, both of Ind.

[73] Assignee: Pullman Incorporated, Chicago, Ill.

[21] Appl. No.: 662,192

[22] Filed: Feb. 26, 1976

[51] Int. Cl.[2] .................. B61D 39/00; B65D 45/20
[52] U.S. Cl. .................................. 105/377; 220/324; 292/256.5; 292/257
[58] Field of Search .............. 292/256, 256.5, 257, 292/111, 113, 114, 65, 66, DIG. 49; 114/203; 105/377; 220/318, 324

[56] References Cited

U.S. PATENT DOCUMENTS

| 1,664,972 | 4/1928 | Dudderar | 292/257 |
|---|---|---|---|
| 1,739,911 | 12/1929 | McMurray | 220/314 |
| 1,799,464 | 4/1931 | Hiser | 292/257 |
| 2,324,356 | 7/1943 | Brown | 220/314 |
| 3,800,714 | 4/1974 | Stark et al. | 105/377 |

FOREIGN PATENT DOCUMENTS 719,729  4/1942  Germany ..................... 292/257

*Primary Examiner*—Paul R. Gilliam
*Assistant Examiner*—Kenneth J. Dorner
*Attorney, Agent, or Firm*—Richard J. Myers

[57] ABSTRACT

A hatch latch mechanism for a railway hopper car having a longitudinally extending handle pivotally and slidingly linked to a hopper car roof which can be upwardly and rearwardly rotated to extend entrappingly across an outboard projection of a hatch cover holddown bar. The handle includes a bottom camming portion downwardly engageable with the outboard projection to compress the hatch cover gasket as the handle is rearwardly rotated to seal the hatch; thereafter, the handle is urged forward in slidingly upward engagement about the outboard projection of the holddown bar by the upward force of the compressed gasket against the hatch cover to insure automatic positive locking of the latch.

6 Claims, 8 Drawing Figures

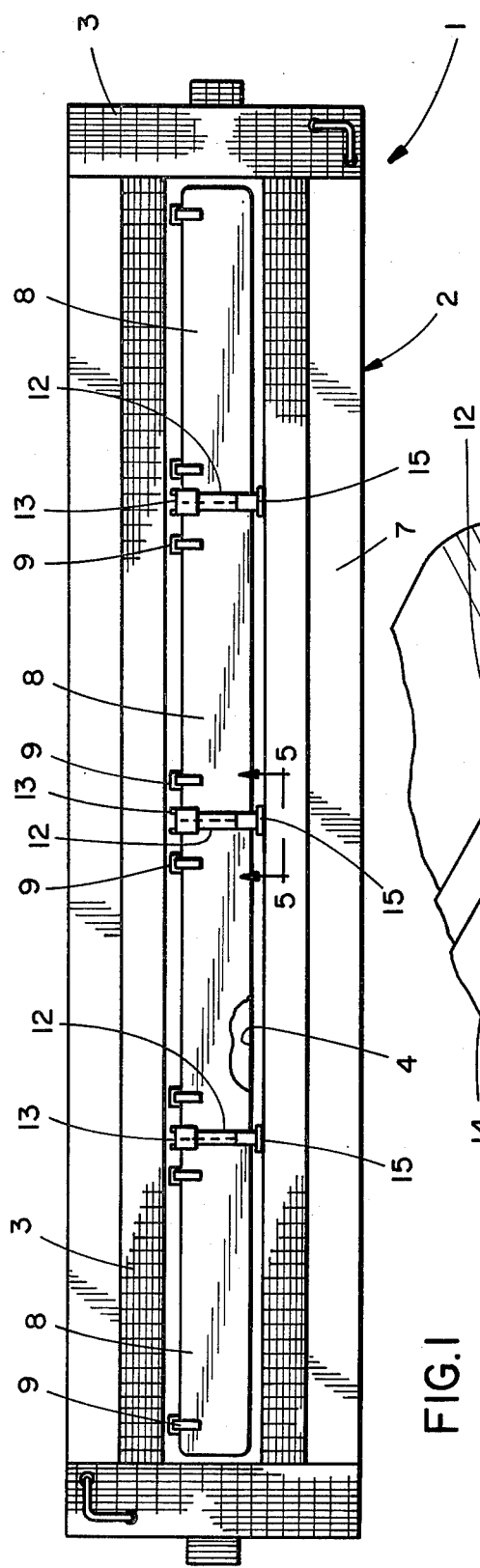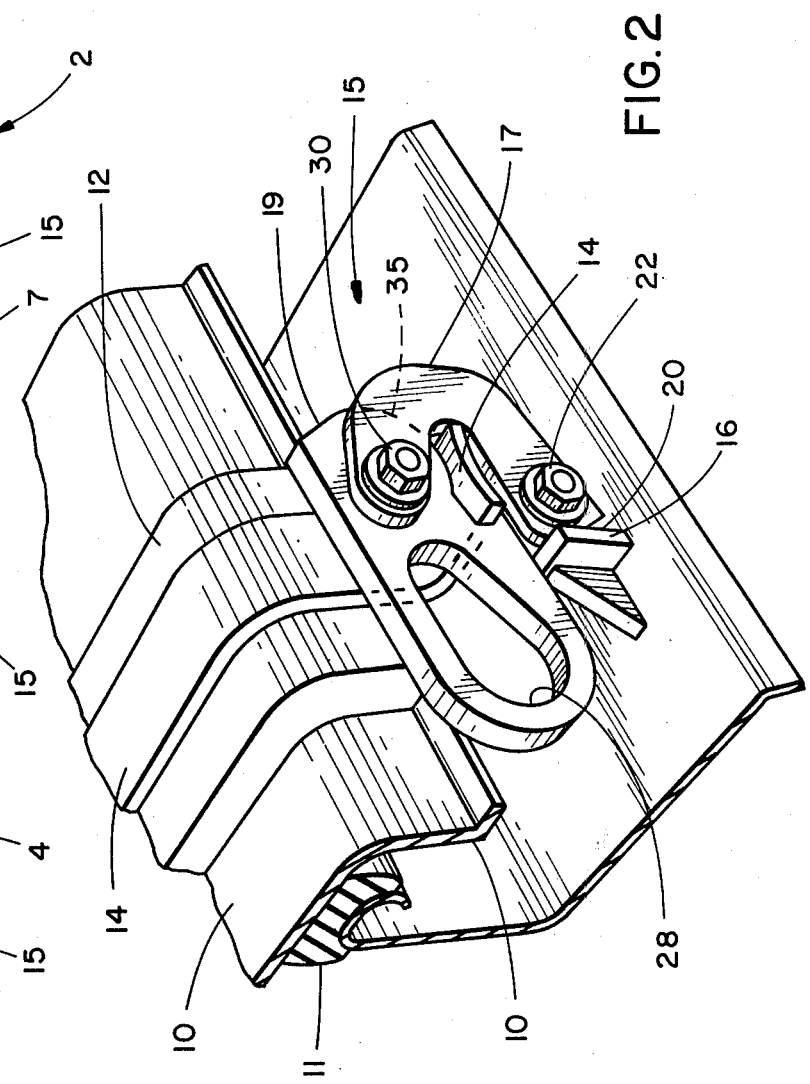

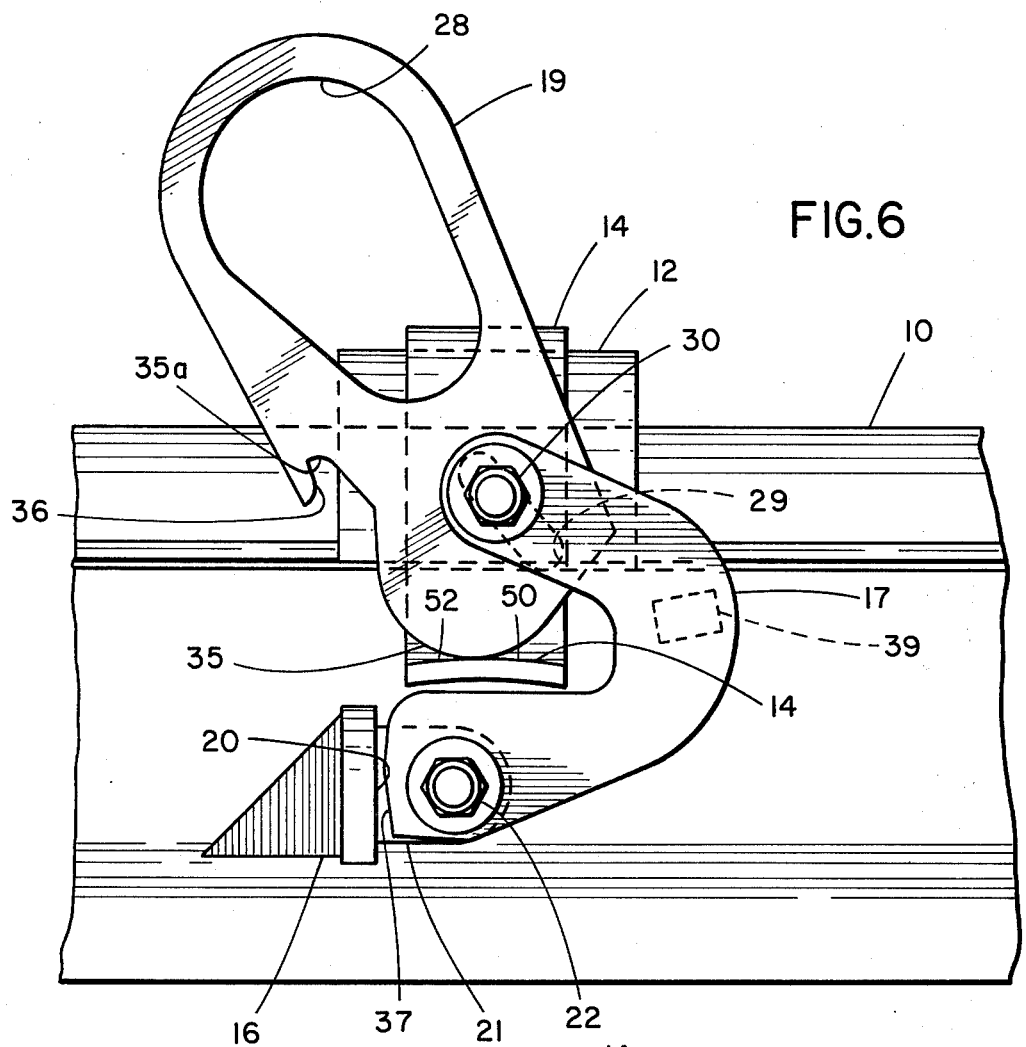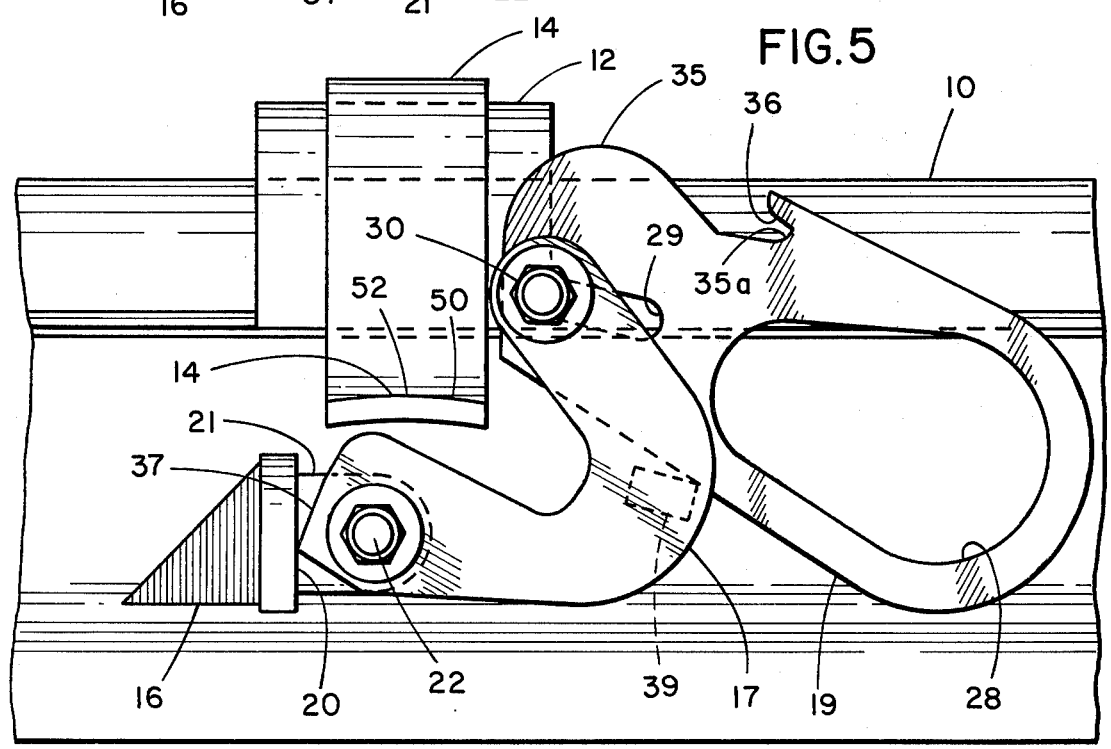

CAM OPERATED HATCH COVER HOLDDOWN

BACKGROUND OF THE INVENTION

1. Field of the Invention

This invention relates generally to railway hopper cars and in particular to latching mechanisms for trough hatch covers provided for longitudinally extending hatch openings in a hopper car.

2. Description of the Prior Art

The prior art discloses a variety of trough hatch latching mechanisms. For example, coapplicant's U.S. Pat. No. 3,800,714 issued Apr. 2, 1974 exemplifies the prior art and is incorporated by reference herein.

Typically, in a hopper car having longitudinally extending trough hatches, a plurality of trough hatches are hingedly positioned longitudinally adjacent to one another for selectively opening and closing portions of an elongated hatch opening provided in the roof of the car. Additionally, a resilient sealing gasket is generally provided about the bottom periphery of each hatch which is partially compressed to sealingly engage the hatch to the roof of the car when the closed hatch is locked into position by its associated latching mechanism.

When analyzing the hatch latching mechanisms disclosed by the prior art, railway workman safety experience should also be considered. More particularly, since hatch latching mechanisms are located on the roof of a hopper car which is generally 12 to 18 feet above the ground, it is essential to provide a latch which will substantially obviate the possibility of a careless workman slipping and falling from the roof of the car and seriously injuring himself while attempting to open or close the latch.

U.S. Pat. No. 3,800,714 cited in the foregoing discloses one method of reducing the possibility of workman injury by providing a latch which only requires a workman to exert effort along the longitudinal axis of the hopper. Thus, if the workman loses his grasp of the latch and falls while attempting to open it, he will fall onto the roof of the car instead of over its side 12 to 18 feet below. Such a latch structure clearly reduces the possibility of injury, but since the prior art latching mechanisms generally require two hands to manipulate, it is difficult for a workman to brace himself while he is operating the latch except by hanging onto the mechanism itself.

SUMMARY OF THE INVENTION

The present invention relates to a simplified longitudinally operable trough hatch latching mechanism for retaining the hold down arm of a hinged hatch cover in its closed position which can be operated with one hand.

The invention discloses a latching mechanism for securing a hatch cover holddown bar which includes an upstanding pedestal rigidly supported on the roof of the car beneath an outwardly extending projection or locking portion provided on the end of the holddown arm. The pedestal pivotally supports a vertical C-shaped linkage longitudinally extending above and about the outward projection of the hold down bar. The upper end of the C-shaped linkage is pivotally and slidingly connected to a cammed handle member which allows rotation of the handle in vertically diagonally sliding relation relative to the C-shaped linkage from an open position to a closed and locked position; whereby, to secure the hatch the handle is upwardly and rearwardly rotated to extend across the outboard projection of the hold down bar while a bottom camming portion provided thereon engages the outboard projection of the holddown bar and moves it downwardly to compress the hatch cover gasket to seal the hatch. Thereafter, the handle is urged forward in sliding upward diagonal wedge engagement about the outboard projection of the hold down bar by the upward force of the compressed gasket on the hatch cover to insure automatic positive locking of the latch.

It is therefore an object of the present invention to provide a hatch cover latching mechanism which insures automatic positive locking of the closed hatch.

It is another object to provide an improved and simplified longitudinally operable trough hatch latch mechanism which a railway workman can operate with one hand so that he may brace himself with his other hand.

It is another object to provide a trough hatch latch mechanism having a longitudinally extending handle linked to the car roof which can be upwardly and rearwardly rotated to extend across the outboard projection of a hatch cover hold down bar; the handle including a bottom camming portion downwardly engageable with the outboard projection to compress the hatch cover gasket as the handle is rotated to seal the hatch; thereafter, the handle being urged forward in sliding upward diagonal engagement about the outboard projection by the upward force of the compressed gasket against the hatch cover to insure automatic positive locking of the latch.

These and other objects, purposes and advantages will become apparent from reference to the following description, appended claims and attached drawings.

BRIEF DESCRIPTION OF THE DRAWINGS

FIG. 1 is a plan view of a railway hopper car showing a roof provided with a plurality of longitudinally disposed hatch covers for sealing an elongated hatch opening;

FIG. 2 is an enlarged perspective view showing an outward projection of a hatch cover hold down arm engaged by hatch cover latching mechanism of the present invention;

FIG. 5 is an enlarged side elevation view taken substantially along line 5—5 of FIG. 1 showing the latching mechanism fully disengaged;

FIG. 6 is a view similar to FIG. 5 showing the latch mechanism partially disengaged;

DESCRIPTION OF THE PREFERRED EMBODIMENT

Figure 3:
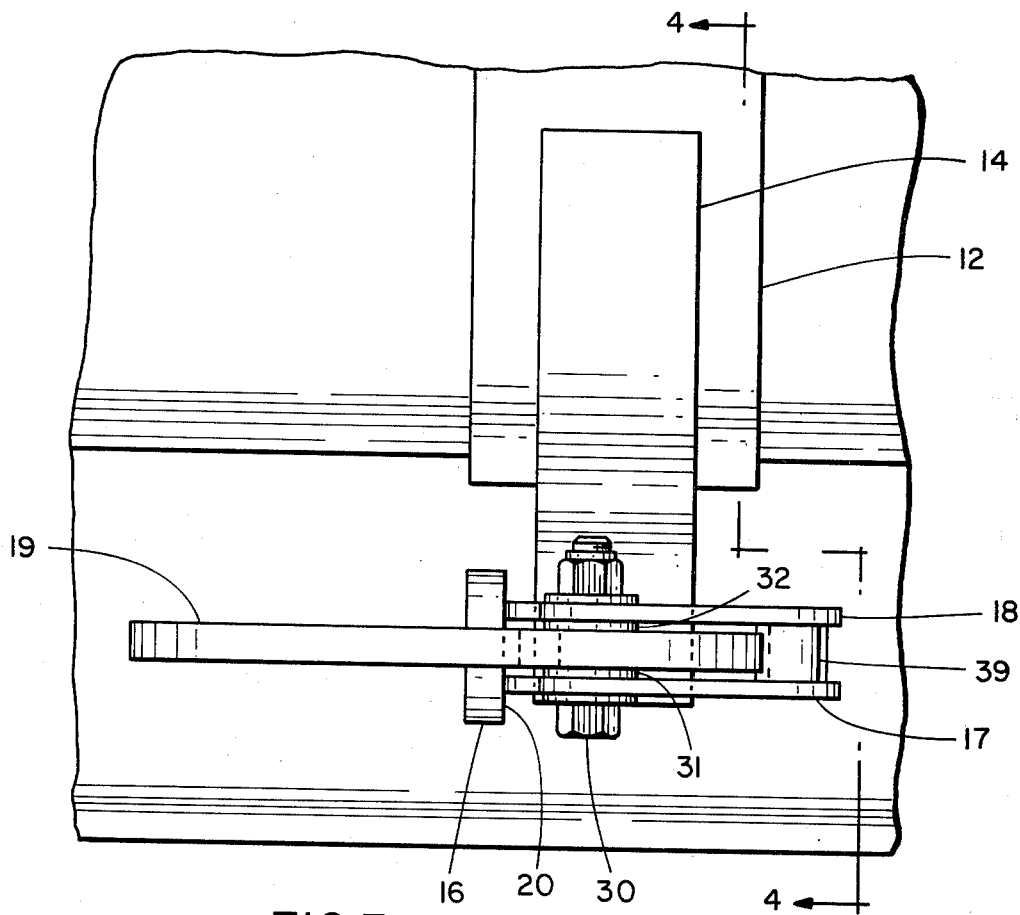
FIG. 3 is an enlarged plan view of the hatch cover latching mechanism.
Figure 4:
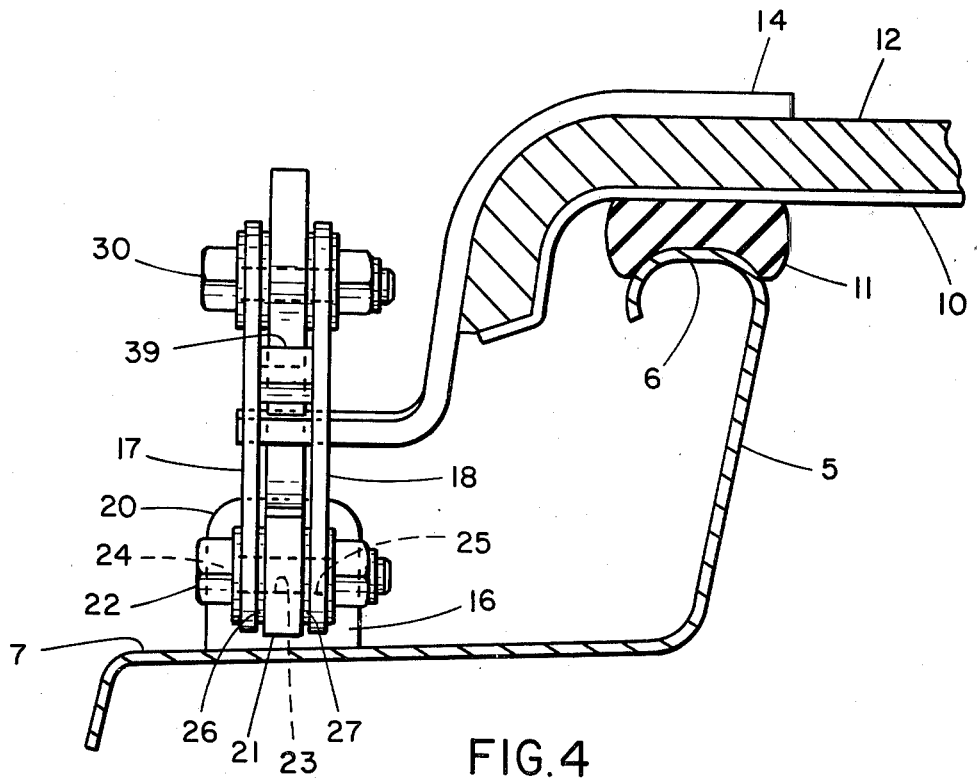
FIG. 4 is a cross-sectional view taken substantially along line 4—4 of FIG. 3.

Turning now to consideration of the drawings and particularly FIG. 1, there shown is a plan view of a railway hopper car 1 having an overlying roof construction 2 including transverse and longitudinal walkways 3. The roof 2 includes longitudinally extending hatch openings 4 having a continuous upstanding coaming 5 including an outwardly extending top flange 6 about their peripheries. The roof construction 2 includes a stepped roof sheet 7 which hingedly supports a plurality of adjacent longitudinally extending trough hatch covers 8 through conventional hinge brackets 9. Each hatch cover 8 includes downwardly and outwardly projecting flanges 10 which are positioned below the arcuate flanges 6 when the hatch is closed. Additionally, resilient hatch sealing elastomer gaskets 11 are provided about the bottom peripheries of the hatch covers 8 which engage the flanges 6 in compressed and sealing relation when the hatch covers 8 are held in a closed position.

To retain adjacent ends of the hatch covers 8 in the closed position, the car structure includes hold down arms or bars 12 which overlie and extend laterally across the adjacent ends of the hatch covers 8. Each of the hold down arms 12 is hingedly connected at one end of the roof 2 by hinge brackets 13, and is secured at the other end through a Z-shaped latch keeper 14 or locking portion by hatch latching mechanism 15 which is most clearly illustrated in FIG. 2 of the drawings.

The hatch latching mechanism 15 includes a base or pedestal 16 upstanding from the roof 2 and linkage including a pair of vertical C-shaped members 17 and 18 pivotally connected at their lower ends to the base 16 and rearwardly extending above and about the outward latch keeper 14. The upper ends of the C-shaped members or linkages 17 and 18 are cooperatively pivotally and slidingly connected to a cammed vertical handle member 19 sandwiched therebetween.

The base 16 includes a vertical laterally extending support or abutment plate 20 secured to the car roof 2 by welding or other well-known means, and a vertical apertured attachment lug or flange 21 extending forwardly therefrom. Thus, the C-shaped members 17 and 18 are cooperatively pivotally secured on opposite sides of the lug 21 by a nut and bolt assembly 22 extending through transversely aligned apertures or holes 23, 24 and 25 in the lug 21 and C-shaped members 17 and 18, respectively. Additionally, bearing or spacing washers 26 and 27 are interposed between the lug 21 and members 17 and 18 to reduce wear and frictional resistance of the pivotal connection between the lug 21 and C-shaped members 17 and 18.

As most clearly shown in FIGS. 3-8, the longitudinally extending vertical handle 19 includes an enlarged handhold aperture or operator engageable means 28 through which the handle may be grasped by a railway workman to manipulate it. The handle has at its inner end a forwardly and upwardly extending diagonal aperture or slot 29. A nut and bolt assembly 30 including bearings or spacing washers 31 and 32, extends through aligned holes or apertures 33 and 34 in the upper ends of the members 17 and 18 and through slot 29 and thus slidingly, pivotally couples the handle 19 to the members 17 and 18. The handle includes a downwardly curved camming surface 35 at its bottom forward edge which forms a locking portion receiving notch 35a with a forwardly protruding lower lip 36 spaced rearwardly below the camming surface 35 to selectively entrap the projection or locking portion 14 extending transversely therebetween. Additionally, it should be noted that when operating the latch mechanism as hereafter described, longitudinal spacing provided between the operator engageable means 28 and the camming surface 35 of the handle 19 assures a mechanical advantage which facilitates one-handed operation of the mechanism by a railway workman.

The invention further provides a means of supporting the handle 19 and C-shaped members 17 and 18 above the car roof 2 to prevent abrasion of the roof when the latch mechanism is disengaged. More particularly as shown in FIG. 5, the rear edge portions 37 and 38 of the C-shaped members 17 and 18 engage the support or abutment plate 20 which restrains further downward movement of the members; and similarly, a lug 39 is sandwiched and secured between the C-shaped members 17 and 18 which limits forwardly downward rotation of the handle 19.

OPERATION

Figure 8:
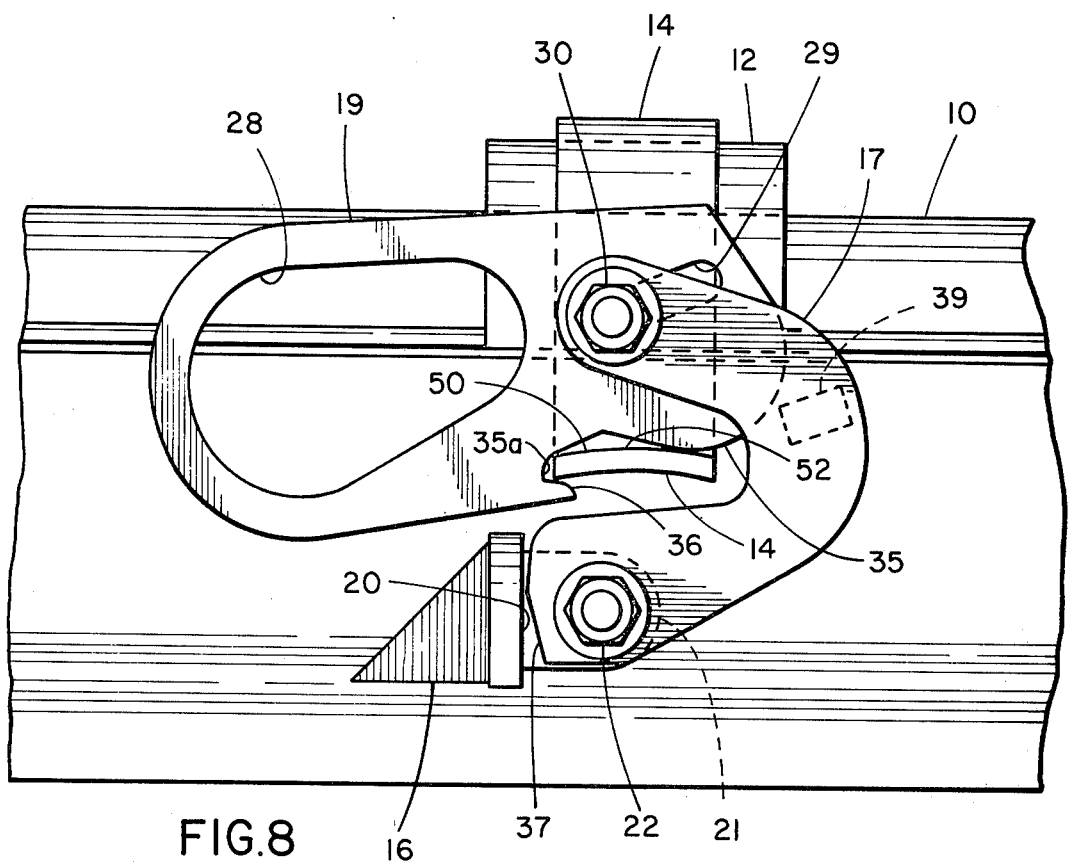
FIG. 8 is still another view similar to FIG. 5 showing the latch mechanism fully engaged in positive locking relation to the hatch cover.
Figure 7:
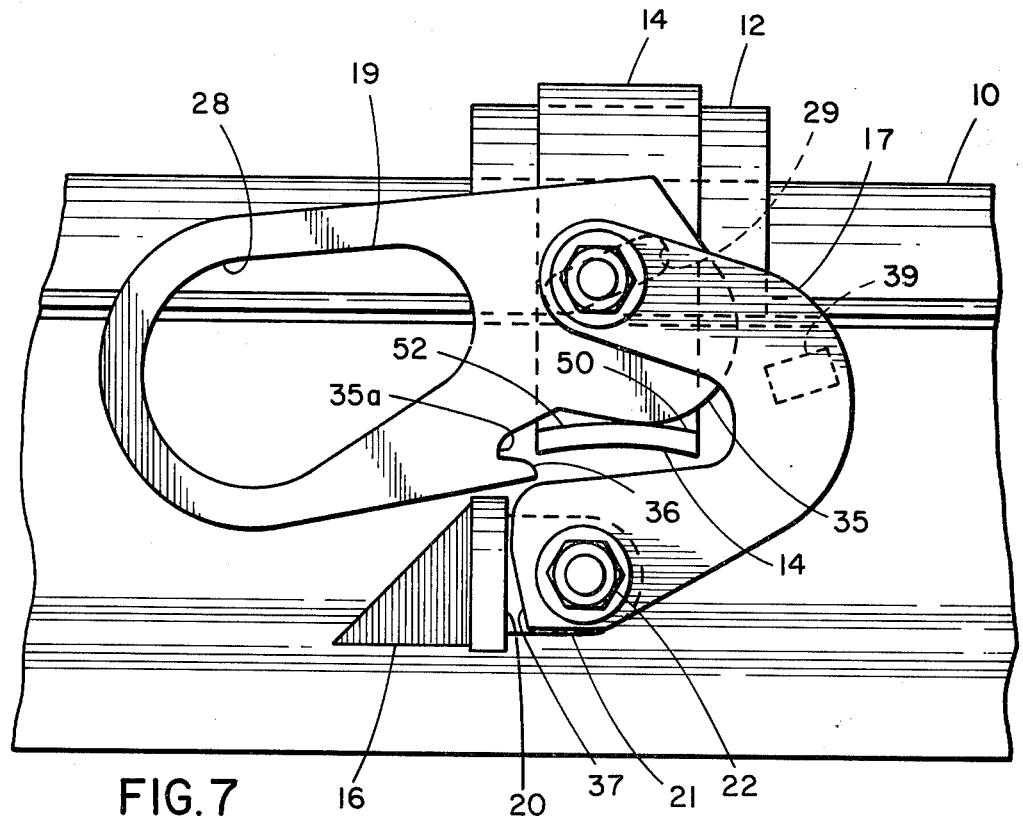
FIG. 7 is another view similar to FIG. 5 showing the latch mechanism partially engaged to compress the hatch cover gasket.

In order to move the hatch latching mechanism from its fully opened position disclosed in FIG. 5 to the fully closed and locked position disclosed in FIG. 8, the handle 19 is grasped through the handhold aperture 28 and raised upwardly and rearwardly in a counterclockwise direction until the bolt 30 in the upper portion of the C-shaped members 17 and 18 is substantially vertically aligned above the bolt 22 as shown in FIG. 6. Then, by continuing counterclockwise rotation of the handle 19, the downwardly curved camming surface 35 urges the projection 14 downward which in turn carries the hold down bar 12 and hatch covers 8 downward to compress the resilient hatch sealing gaskets 11 to seal the hatch covers 11 as disclosed in FIG. 7. Thereafter, the handle 19 is moved forward in sliding relation to the bolt 30 as augmented by the upwardly facing convex curvature of the top surface 50 of the latching extension 14 particularly when the cam edge profile rides over the crest of curvature indicated at 52 of the arcuate surface 50 whereupon not only is the wedging action between the bolt assembly and the lower edge face 53 of the slot 29 accentuated but the latch is biased rightwardly as seen in FIG. 8. The projection 14 is thereupon cooperatively entrapped between the lip 36 and the camming surface 35 to positively lock the projection 14 and therefore the closed hatch covers 8. By reversing the above operation, the hatch latching mechanism can be returned to its fully opened position. That is the handle is pulled downwardly and leftwardly and thereafter rotated in a clockwise direction.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed is:

1. For a hopper car hatch structure including a roof having a coaming defining a hatch opening, a hatch cover hingedly connected to said roof for movement between open and closed positions relative to said opening, and a hold down means supported on said roof including portions engaging said hatch cover in said closed position, said hold down means having a locking portion projecting horizontally outward relative to said coaming in the closed position of said hatch, a hatch cover latching mechanism, comprising:

an upstanding pedestal supported from the roof of the car substantially beneath the locking portion;

an upstanding linkage having upper and lower end portions, said lower end portion being pivotally coupled to said pedestal;

a rearwardly extendable vertical locking handle including a forward end portion, means coupling said handle at said forward end portion to said upper end portion of said linkage for pivotal and diagonal upward sliding movement relative to said linkage, said handle including a forward bottom portion having a downwardly convex camming surface engageable with the locking portion and a forwardly extending lip defining a horizontal notch spaced rearward and below said camming surface for receiving an edge of said locking portion;

said means coupling the handle to the upper portion of the linkage comprising, a transverse forwardly upward elongated aperture in said forward portion of the handle;

said upper portion of the linkage having a transverse attachment aperture; and an upper pivot pin cooperatively extending through said apertures and coupling the handle and linkage in said pivotal sliding relation.

2. For a hopper car hatch structure including a roof having a coaming defining a hatch opening, a hatch cover hingedly connected to said roof for movement between open and closed positions relative to said opening, and a hold down means supported on said roof including portions engaging said hatch cover in said closed position, said hold down means having a locking portion projecting horizontally outward relative to said coaming in the closed position of said hatch, a hatch cover latching mechanism, comprising:

an upstanding pedestal supported from the roof of the car substantially beneath the locking portion;

an upstanding linkage having upper and lower end portions, said lower end portion being pivotally coupled to said pedestal;

a rearwardly extendable vertical locking handle including a forward end portion, means coupling said handle at said forward end portion to said upper end portion of said linkage for pivotal and diagonal upward sliding movement relative to said linkage, said handle including a forward bottom portion having a downwardly convex camming surface engageable with the locking portion and a forwardly extending lip defining a horizontal notch spaced rearward and below said camming surface for receiving an edge of said locking portion;

said pedestal including a vertical transverse abutment plate and a vertical linkage attachment flange extending forwardly from said abutment plate;

said attachment flange and the lower end of the linkage having transversely aligned holes therethrough and a transverse connecting pin cooperatively extending through said holes and pivotally coupling said lower end of the linkage and the attachment flange;

said lower end having a rear edge portion engageable against said abutment plate to limit downward movement of the linkage; and said linkage including a pair of transversely spaced rearwardly facing C-shaped members flanking said handle and flange.

3. The invention according to claim 2, and a supporting lug secured between said C-shaped members and spaced from said upper and lower portions and located in the path of movement of the handle and engageable therewith to limit forward downward rotation of the handle.

4. For use in a hopper car roof hatch structure comprising a hatch opening and a hatch cover hingedly connected to said roof for movement between open and closed positions relative to said opening in which a holddown arm is supported on said roof having portions engaging said hatch cover in said closed position and wherein said holddown arm has a keeper portion projecting horizontally outward toward a side of the car in the closed position of said cover;

an upstanding linkage having upper and lower end portions, means pivotally mounting said lower end portion about a fixed generally horizontal axis;

said means including a vertical transverse abutment plate and a vertical linkage-attachment flange extending forwardly from said abutment plate;

said lower end portion of the linkage being engageable against said abutment plate to limit downward movement of the linkage;

said upper portion of the linkage having an attachment aperture transversely defined through the linkage;

a latch having a rearwardly extendable vertical locking handle including a forward end portion having a forwardly upward elongated transverse slot;

said handle having a forward bottom portion with a downwardly convexed camming surface engageable with the locking portion and a forwardly extending lip defining a horizontal notch spaced rearward and below said camming surface adapted to receive an adjacent portion of said locking portion;

an upper pivot pin cooperatively extending through said attachment and elongated apertures coupling the handle and linkage in pivotal sliding relation;

said linkage including a pair of transversely spaced rearwardly curved C-shaped members embracing said handle and flange therebetween, a supporting lug secured to said C-shaped members in spaced relation to said upper and lower portions to engage the handle and thus limit forward downward rotation of the handle; and a handhold opening in said handle.

5. The invention according to claim 4, and safety locking means for augmenting movement of the handle in the locking direction.

6. For a hopper car hatch structure in a roof having a hatch opening and a hatch cover displaceable between open and closed positions relative to said opening, a resilient elastomer hatch cover gasket compressibly engageable between the hatch cover and the roof, a hold down arm overlapping said hatch cover in said closed position, said hold down arm having a locking portion projecting laterally outwardly relative to said cover, a hatch cover latching mechanism, comprising:

an upstanding C-shaped linkage having upper and lower end portions receiving said locking portion therebetween, said lower end portion being pivotally supported on an axis below said locking portion;

a locking handle, coupling means securing the handle to the upper end portion of said linkage in pivotal and longitudinally vertically sliding relation, and said handle including a bottom portion with a downwardly convex camming surface engageably cammed over the locking portion and having below said camming surface a lip defining a horizontal notch alignable with said locking portion to receive the same in the locked position of the latch; and said latch adapted upon camming against said surface of the locking portion to bias the same downwardly and thereby compress the gasket between the hatch cover and roof, whereafter said handle is moved longitudinally upward by the reaction force of the compressed gasket to enter the locking portion within the notch between said lip and camming surface.

* * * * *